United States Patent [19]  [11] 4,109,473
Valantin  [45] Aug. 29, 1978

[54] ROOF SUPPORTS
[75] Inventor: Alfred A. Valantin, Clermont, France
[73] Assignee: Charbonnages de France, Paris, France
[21] Appl. No.: 808,548
[22] Filed: Jun. 21, 1977
[30] Foreign Application Priority Data
Jun. 29, 1976 [FR] France .................................. 76 19718
[51] Int. Cl.² .............................................. E21D 15/44
[52] U.S. Cl. .................................................. 61/45 D
[58] Field of Search .................... 61/45 D; 299/31–33; 248/357; 91/170 MP
[56] References Cited
U.S. PATENT DOCUMENTS
2,826,898 3/1958 Joy ........................................ 61/45 D
FOREIGN PATENT DOCUMENTS
1,030,282 5/1958 Fed. Rep. of Germany .......... 61/45 D
1,092,412 11/1960 Fed. Rep. of Germany .......... 61/45 D
1,139,084 11/1962 Fed. Rep. of Germany .......... 61/45 D
1,171,859 6/1964 Fed. Rep. of Germany .......... 61/45 D
766,811 1/1957 United Kingdom ..................... 61/45 D Primary Examiner—Dennis L. Taylor
Attorney, Agent, or Firm—Cushman, Darby & Cushman

[57] ABSTRACT

A roof support capable of being moved by a drive mechanism while under permanent load includes two pairs of carriages, each carriage carrying an articulated track. The carriages of each pair are arranged one above the other and the two pairs of carriages are disposed parallel. The upper carriages can then be applied against the roof and the lower carriages against the floor of an underground gallery. The upper carriages are connected by at least one cross-member and the lower carriages are connected by two cross-members, and means are arranged to apply a force to the cross-members to separate the upper carriages from the lower carriages. The cross-members and carriages are connected together by pivotal joints.

12 Claims, 16 Drawing Figures

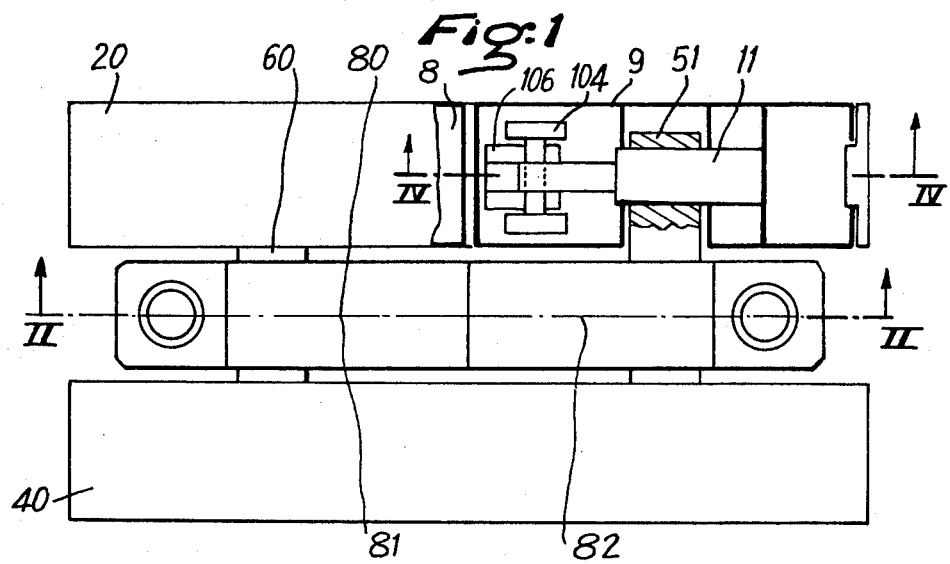
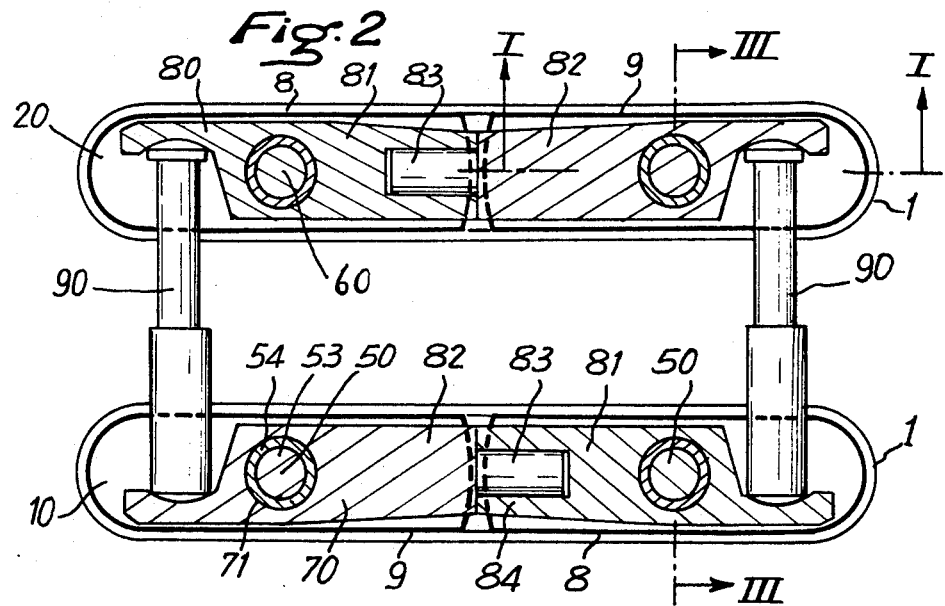
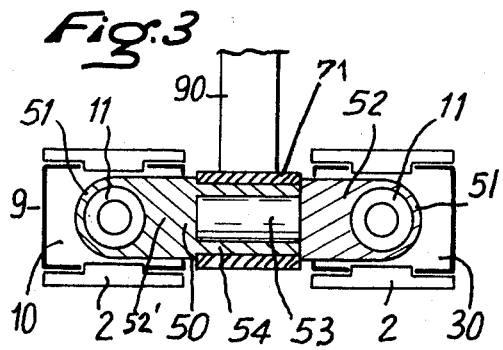
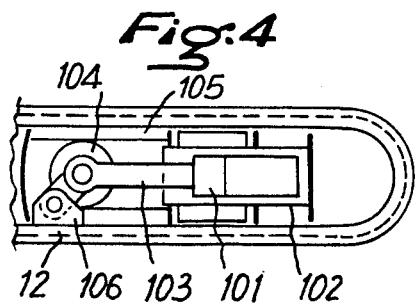

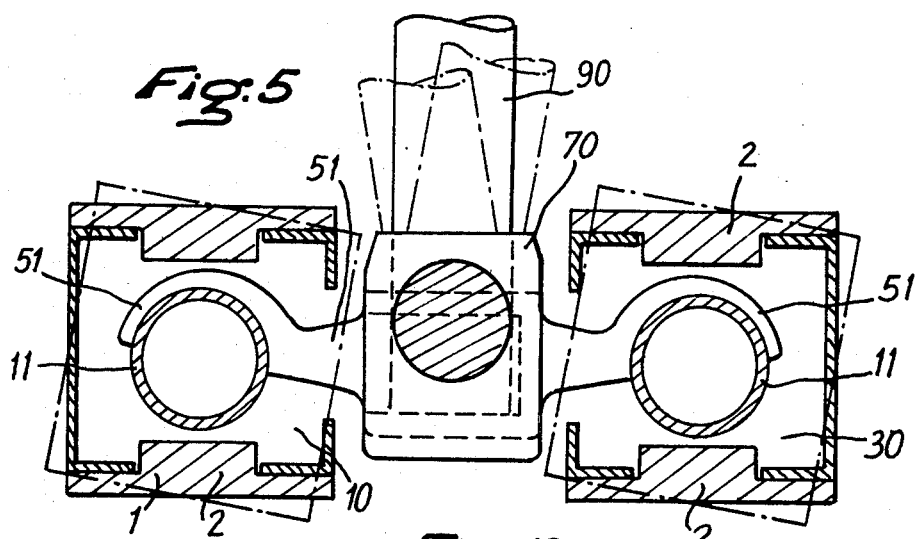
Fig:5
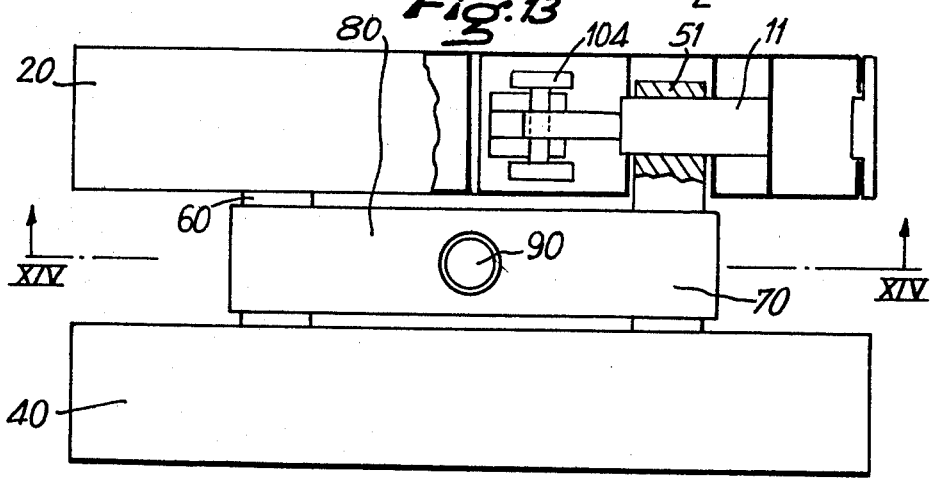
Fig:13
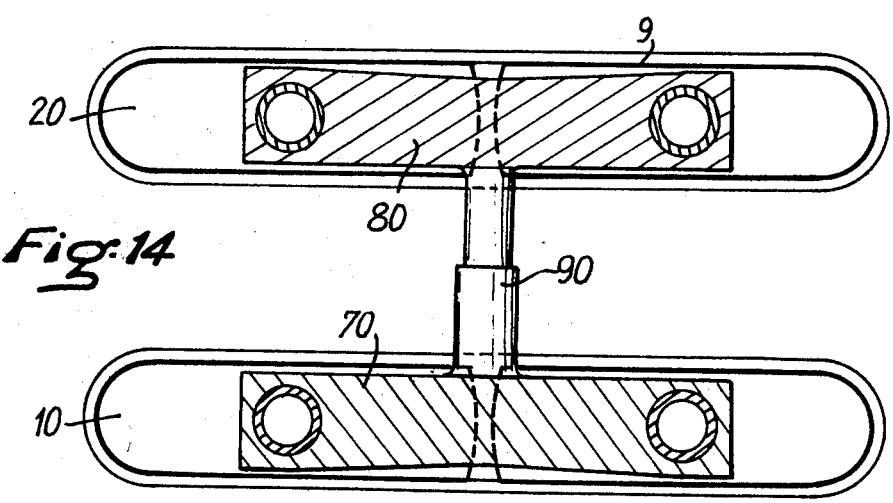
Fig:14

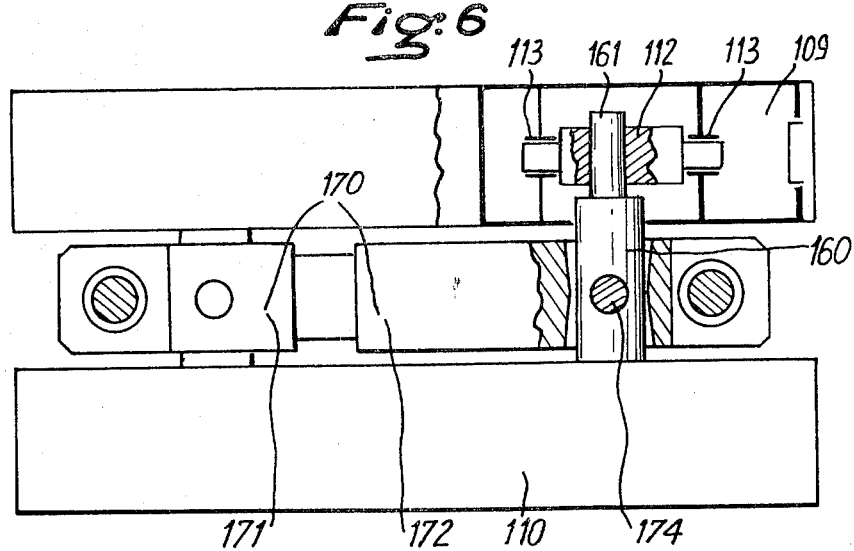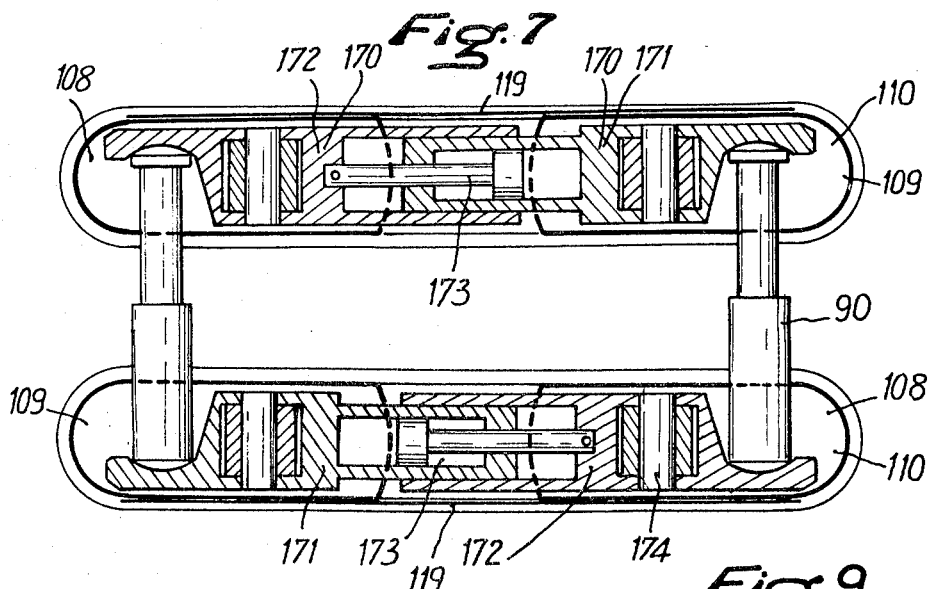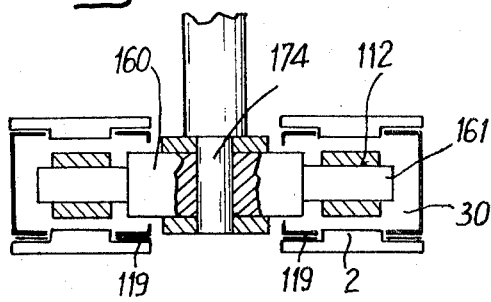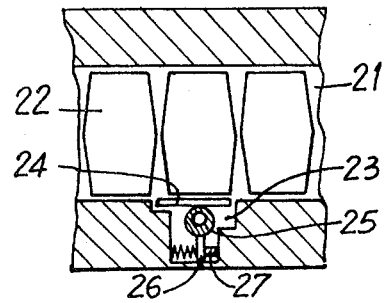

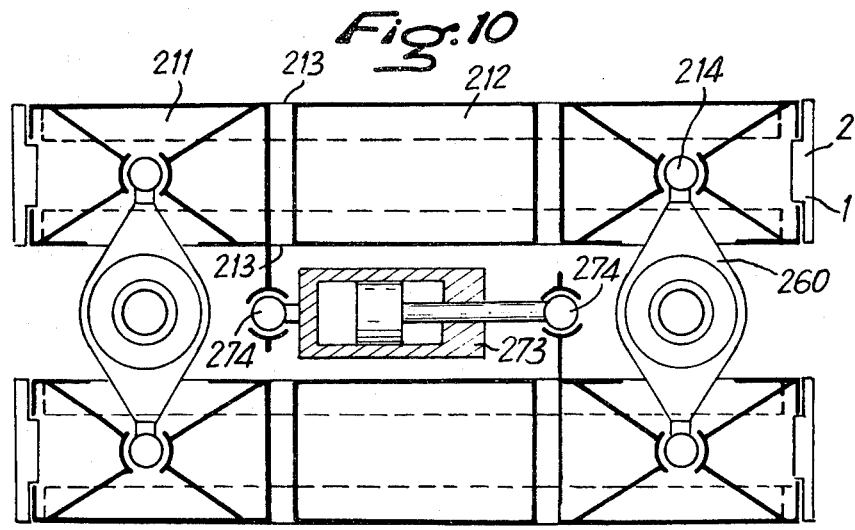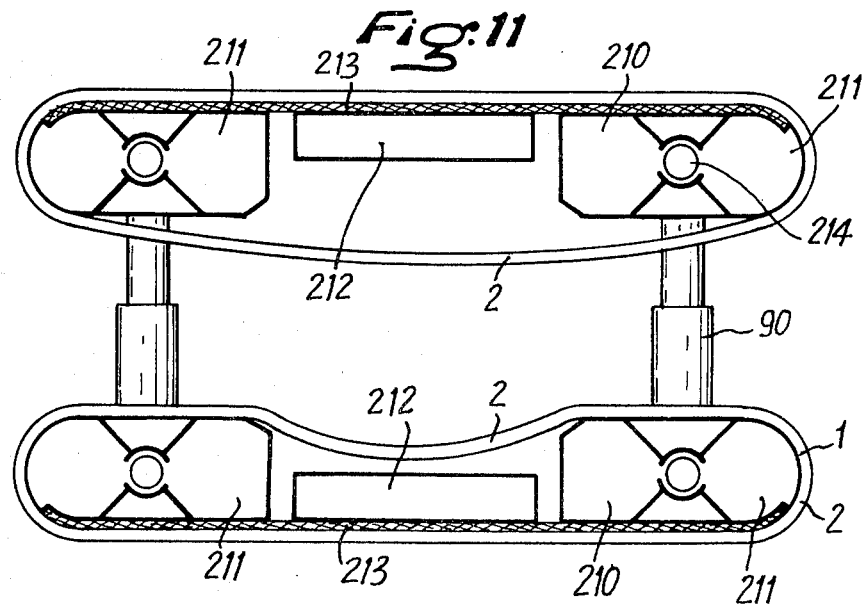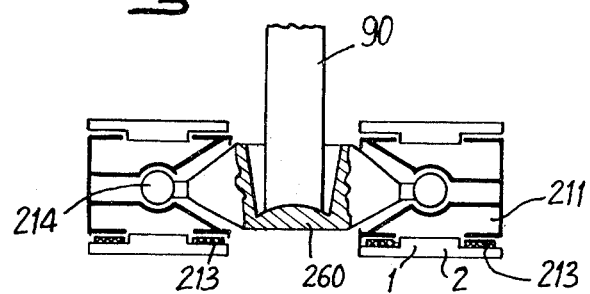

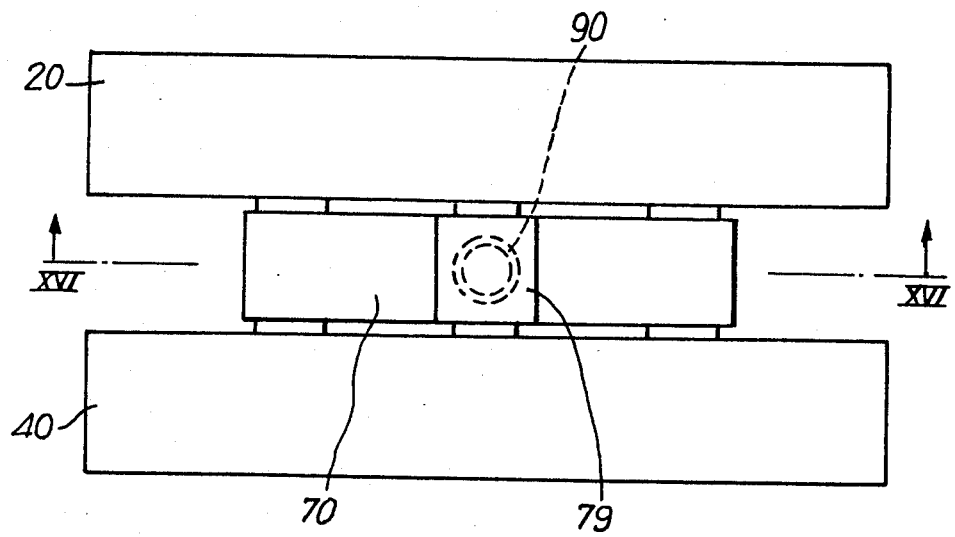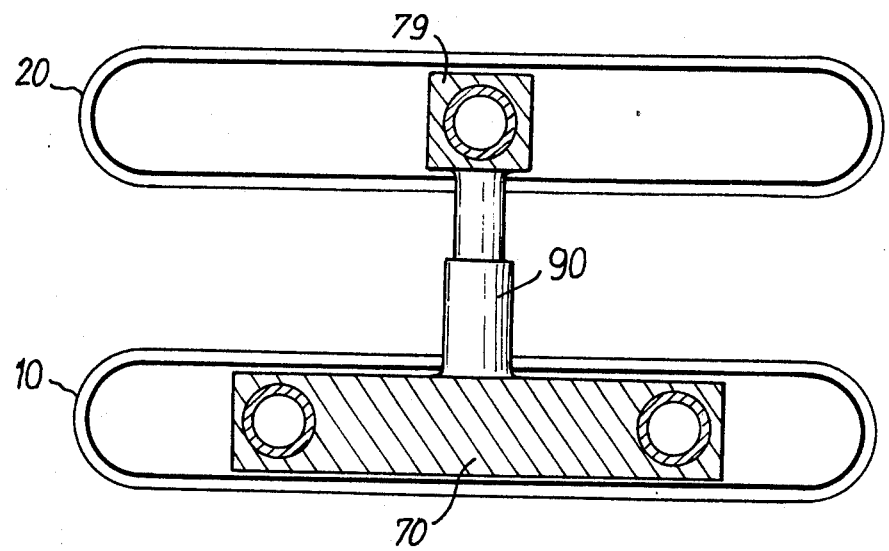

ROOF SUPPORTS

BACKGROUND OF THE INVENTION

The present invention relates to a roof support capable of being moved by a drive mechanism whilst under permanent load.

DISCUSSION OF THE PRIOR ART

German Patent Application No. 1,139,084 describes a roof support comprising two parallel pairs of carriages for articulated tracks, each pair comprising a lower carriage and an upper carriage applied respectively against the floor and the roof of a gallery by hydraulic props. These props act at their ends upon beams of the carriages upon which the tracks slide. Each pair of tracks has its particular drive means.

Such a support is ill-adapted to ground irregularities and may therefore be required to support, for example, a considerable load on one prop whereas the other prop remains lightly loaded.

SUMMARY OF THE INVENTION

The aim of the invention is to provide a roof support wherein the load is very regularly distributed.

According to the present invention there is provided a roof support capable of being moved by a drive mechanism whilst under permanent load, comprising at least two parallel pairs of carriages, each carriage having an articulated track, the carriages of each pair being disposed one above the other, the upper carriages being applicable against the roof and the lower carriages being applicable against the floor of a gallery by way of a force applied to separate the upper carriages from the lower carriages, and at least three cross-members, each cross-member joining two parallel carriages, the cross-members and the carriages being joined to one another by pivotal joints to have at least two axes of rotation.

In an embodiment, the support comprises at least four cross-members, including at least two connecting two parallel lower carriages and at least two connecting two parallel upper carriages.

Preferably, the driving direction of the support is determined by selective means arranged to enable unilateral movement of each track with reference to its carriage, and these selective means enabling unidirectional movement may be reversible.

In an embodiment each upper cross-member joining two parallel upper carriages is arranged to face a corresponding lower cross-member joining two parallel lower carriages, and further comprising means for applying said separating force connected between each pair of facing cross-members.

In a preferred embodiment an upper longitudinal member is arranged intermediate the two parallel upper carriages and a lower longitudinal member is arranged intermediate the two parallel lower carriages, the upper longitudinal member connecting the upper cross-members and the lower longitudinal member connecting the lower cross-members, and at least one device for applying said separating force is arranged to act on said cross-members by way of said longitudinal members. The longitudinal members and the cross-members may be joined to one another pivotal joints to have at least one axis of rotation. The cross-members may be divided into two parts pivotally connected about a longitudinal axis. At least one longitudinal member may be divided into longitudinal elements pivotally joined together, the joint being, for example, a rotary joint with a longitudinal axis.

In an embodiment, the longitudinal elements of one and the same longitudinal member may be joined by a jack for moving them towards and away from each other.

In an embodiment, each carriage comprises a return beam for the track, and the beam may be divided into longitudinal elements.

In a preferred embodiment, the longitudinal elements of each beam are spaced and joined by torsion bars, and the carriage comprises at least two guide rails for the track, at least one of which is fixed to each element and extends substantially along the beam, at least on its supporting face, and between the longitudinal elements.

In this case it is advantageous for the guide rails to constitute the torsion bars joining the longitudinal elements.

In a carriage wherein the beam has a rounded end directly enclosed by its track which is mounted on and guided frictionally by the beam and by the rounded return ends, the track may be guided with lateral play on the straight part of the beam and without play on the rounded return ends.

In an embodiment, the carriages and the longitudinal members are extensible, and the drive mechanism comprises, for each of the longitudinal members, a jack to move its longitudinal elements towards or away from each other and the selective means for unidirectional movement comprise unidirectional locking means for at least one shoe of each track on its carriage.

In a further embodiment, the drive mechanism comprises a first control jack for relative parallel movement of two parallel upper carriages and a second jack for relative parallel movement of two parallel lower carriages and the selective means for unidirectional movement comprise unidirectional locking means for each track on its carriage.

It is advantageous in this case for the joints between the carriages and the cross-members to be ball and socket joints.

BRIEF DESCRIPTION OF THE DRAWINGS

Embodiments of the present invention will hereinafter be described by way of example with reference to the accompanying drawings, in which:

FIG. 1 is a diagrammatic plan view partly in section along line I—I of FIG. 2, of a roof support according to a first embodiment of the invention;

FIG. 2 is a longitudinal section of the roof support through the plane of symmetry shown as line II—II in FIG. 1;

FIG. 3 is a partial view of a section along line III—III of FIG. 2;

FIG. 4 is a section along line IV—IV of FIG. 1;

FIG. 5 is a drawing similar to FIG. 3, showing possible positions of the carriages;

FIGS. 6 to 8 are similar to FIGS. 1 to 3 showing another embodiment of the invention;

FIG. 9 shows a construction detail of the embodiment of FIGS. 6 to 8;

FIGS. 10 to 12 are similar to FIGS. 1 to 3 showing a third embodiment of the invention;

FIGS. 13 and 14 illustrate, similarly to FIGS. 1 and 2, another embodiment of the support according to the invention; and FIGS. 15 and 16 show, in similar manner to FIGS. 1 and 2, another embodiment of the invention.

DESCRIPTION OF PREFERRED EMBODIMENTS

The roof support shown in FIGS. 1 to 4 comprises four carriages 10, 20, 30 and 40, each provided with an articulated track 1, and arranged in pairs with the carriages in each pair arranged one above the other. The two carriages 10 and 20 of one pair, arbitrarily referred to as on the left-hand side, are shown in FIG. 2. Carriage 10 and carriage 20 respectively constitute the lower tread and the upper tread of the roof support and are clamped against the floor and the roof of an underground chamber as is described below. The two carriages 30 and 40 of the other pair are arranged parallel to the carriages 10 and 20 of the first pair and are arbitrarily referred to as on the right-hand side of the roof support. The carriages 30 and 40 are identical in construction to the carriages 10 and 20.

Two identical cross-members 50 connect the two lower carriages 10 and 30 near the ends thereof, and two identical cross-members 60, which are identical to the cross-members 50, similarly connect the two upper carriages 20 and 40 near the ends thereof.

The two lower cross-members 50 are joined by a longitudinal member 70, and the two upper cross-members 60 are joined by a longitudinal member 80.

Two jacks 90, acting as props, are each connected between the two longitudinal members 70 and 80. Extension of the props 90 acts to separate the longitudinal members 70 and 80 and hence the cross-members 50 and 60 and thereby loads the roof support.

Each carriage 10, 20, 30 and 40 contains a drive mechanism having a jack 101 the cylinder 102 of which is fixed to a frame acting as the beam of the carriage. The piston rod 103 carries a shoe 106 which bears directly against shoes 2 of the shoe type articulated track 1 which closely surrounds the beam of the carriage. The end of the piston rod 103 also carries a roller 104 which is guided along a slideway 105 in the frame of the carriage. In this way, every time the jack 101 is extended the carriage is moved towards the right as seen in FIGS. 2 and 4, because the shoe 106, arranged for that purpose beyond the point of attachment of the roller 104 to the end of the rod 103, is locked against the track 1 by the reaction of the roller 104 against the slideway 105. In the opposite direction, the return of the piston rod retracts by sliding the shoe 106 which is no longer locked against the track 1 by the roller 104. In this way unidirectional movement of each carriage is obtained.

The assembly of cross-members 50, 60 and the carriages 10, 20, 30, 40 will now be explained.

In order to receive a cross-member 50 or 60, each carriage 10, 20, 30, 40 carries, near each of its ends, a longitudinally extending axle 11, the two axles 11 of each carriage being substantially coaxial. Each cross-member 50 or 60 has a sleeve 51 at each end thereof which surrounds the respective axle 11 and can pivot with respect thereto. In addition, each cross-member 50 or 60 is divided into two parts, one part 52 carrying a projection 53 whose axis extends coaxially with the respective cross-member 50 or 60, and the other part 52' having a sleeve 54 which receives and surrounds the projection 53 and is pivotable with respect thereto. In this way, a high degree of flexibility of pivotal movements of the joining elements of the support is obtained.

In order to obtain greater flexibility the sleeves 54 of each cross-member 50, 60 are externally shaped to provide a pivot axis for the respective longitudinal member 70, 80 which each carry a sleeve 71 for that purpose.

The props 90 are pivotally connected to the ends of the longitudinal members 70 and 80.

FIG. 5 shows a cross-section through the lower tread of the roof support illustrating practical positions of the support described, in which the hinging possibilities of the carriages and of the props with reference to a cross-member and to the associated longitudinal member are illustrated by dash-dot lines.

It is also possible to improve the flexibility of the support in use by dividing each longitudinal member 70 or 80 into two elements 81, 82 joined by a longitudinal pivot axis obtained by providing a pin 83 on one element 81 and by providing a sleeve 84, co-operating with the pin 83, on the other element 82.

Another way to enable the flexibility of the roof support to be increased is to divide each beam of the carriages 10, 20, 30, 40 into two non-contiguous longitudinal elements 8, 9 which are pivotally connected by way of the cross-members 50, 60 and the longitudinal member 70 or 80 and flexibly jointed to the track 1. A single drive mechanism is arranged in one of the carriages, but it is also possible to provide one in each carriage, for example one for each of the two directions of travel.

FIGS. 6 to 8 illustrate an embodiment of the invention in which the drive mechanism is no longer situated in the carriages, but is disposed in each of the longitudinal members. In this embodiment the four carriages 110 are each divided into two longitudinal elements 108, 109. The roof support therefore comprises four upper half carriages and four lower half carriages. Two upper half carriages at the same longitudinal end of the support are joined by a rigid cross-member 160. Similarly the two upper half carriages at the other end of the support are joined by a further rigid cross-member 160. In the same way, the two lower half carriages at one end of the support are joined together as are the two lower half carriages at the other end of the support. Each half carriage 108, 109 carries a part 112 journalled at each end thereof in bearings 113 so that the part 112 can pivot about the longitudinal axis thereof. In addition, each part 112 has a transverse slot therein receiving a projecting end 161 of the respective cross-member 160 whereby the part 112 can pivot about the projecting end 161.

As in the previous embodiment, the props 90 are connected between two longitudinal members 170 arranged intermediate the carriages on the right-hand side and on the left-hand side of the support. As is shown in FIG. 7, each longitudinal member 170 is formed by two longitudinal elements 171 and 172 which are joined by a jack 173 which enables the elements 171 and 172 to be moved towards and way from each other at will. Each longitudinal element 171, 172 is pivotally connected to the associated cross-member 160 at a joint 174. The pivot axis of the joint 174 is perpendicular to both the cross-member 160 and the longitudinal member 170.

In this embodiment, as in the previous embodiment, the beam of each carriage has rounded ends and the articulated track 1 is mounted on and guided frictionally along the beam and around the ends in the manner described in French Patent Application No. 76 01961.

It is this track 1, the shoes 2 of which are used directly, which provides unidirectional movement of the roof support.

To this end, a unidirectional locking device as shown in FIG. 9 is provided for each track. The device comprises a guide path 21 which is provided in the beam of the carriage for receiving protuberances 22 of the shoes 2. A recess 23 is provided in the guide path 21 for a shoe 24 which can be urged in one direction by an eccentric 25 or escape from it in the other direction. This option is obtained due to the fact that the eccentric 25 is equipped with a lug 26 which is forced in one direction into abutment against a fixed stop 27 and in the other direction against a spring 28. The choice of the permitted direction of travel of the shoes 2 and hence the track 1 is determined by the respective positions of the stop 27 and of the spring 28, these positions being reversible as desired.

Since each carriage is constituted by two half-carriages, the distance between which will vary as the two longitudinal elements 108 and 109 move towards and away from one another, slack will be produced in the track 1 as the two longitudinal elements move towards one another. The applicants have found that this slack does not present any practical disadvantages.

It is advantageous for the two longitudinal elements 108, 109 each to have on one side, and at least on one of their two faces on that side, a guide rail 119 which extends as a bridge as far as the other longitudinal element. The guide rail 119 carried by one longitudinal element is arranged to be slidable with respect to the other longitudinal element of the carriage so that the relative movement of the two longitudinal elements is not restricted thereby. The guide rails 119 guide the track 1 of the carriage.

From the description given above with reference to FIGS. 6 to 9, it will be seen that the roof support can move forward step-by-step by extension and contraction of the jacks 173 in the longitudinal members 170. The movement of the support can be in steps of any length, not necessarily in steps which are a multiple of the steps of the jacks 173.

In the roof support shown in FIGS. 10–12, each carriage 210 is divided into three elements, namely two symmetrical end elements 211 and one central element 212. These elements are spaced from one another and joined by a pair of torsion bars 213 arranged on the support face of the carriage. The torsion bars 213 simultaneously act as guide rails for the track 1. The central element 212 is a simple box giving good transverse stability, but permitting an advantageous torsional flexibility by virtue of the torsion bars.

The facing elements 211 of the upper carriages 210 are joined by rigid cross-members 260 which are joined to the elements 211 by pivotal joints 214. The facing elements 211 of the lower carriages 210 are similarly joined by rigid cross-members 260. Each lower cross-member 260 is connected to the upper cross-member 260 directly above by a prop 90. The ends of the prop 90 are connected to the cross-members 260 by way of ball and socket joints. A unidirectional locking device as is shown in FIG. 9 is provided in each carriage for its respective track.

The two upper carriages are also connected to each other through an intermediate intermediary jack 273 extending substantially parallel to the carriages. Elongation or contraction of the jack 273 has the effect of moving one of the two upper carriages with reference to the other in a substantially parallel direction. An intermediate jack similarly connects the two lower carriages.

Conveniently the two elements 211 of the two upper or lower carriages which are spaced the farthest from each other are connected to the jack 273 preferably by ball and socket joints 274, such as swivel joints or cardan joints.

FIGS. 13 and 14 illustrate a roof support of which the carriages 10, 20, 30, 40 are identical to those of the support of FIGS. 1 to 5, but in which the longitudinal members 70, 80 are in one piece and are spaced by a single prop 90. The other compatible characteristics of the support of FIGS. 1 to 5 are retained.

FIGS. 15 and 16 illustrate another embodiment in which the four carriages 10, 20, 30, 40 are each formed by a rigid beams. The connections between the carriages and the cross-members, between the cross-members and the lower longitudinal members are identical to those of the support shown in FIGS. 1 and 2. However, the two upper carriages are joined by a single cross-member and the prop 90 spaces the lower longitudinal member 70 and the single upper cross-member to which it is pivotally connected by way of a sleeve 79.

In all the embodiments described, it is advantageous in order to facilitate the flexibility of passage of the roof support, for the track, more particularly where it is guided frictionally on the beam, to be guided with play on the straight part of the beam but without play on the rounded return ends of the said beam.

I claim:

1. A roof support capable of being moved by a drive mechanism while under permanent load, comprising:
   a pair of upper parallel carriages;
   a pair of lower parallel carriages;
   the pair of upper parallel carriages being disposed above and parallel to the lower pair of parallel carriages;
   four endless, articulated tracks, one guided about each respective carriage;
   two longitudinally spaced upper cross-members connecting the parallel carriages of the upper pair;
   two longitudinally spaced lower cross-members connecting the parallel carriages of the lower pair;
   said connecting of these four cross-members being provided by pivotal joint means interpased between each respective cross-member and carriage and providing at least two axes of rotation therebetween;
   an upper longitudinal member arranged laterally intermediate the upper parallel carriages and connecting the upper cross-members;
   a lower longitudinal member arranged laterally intermediate the lower parallel carriages and connecting the lower cross-members;
   said connecting of the longitudinal members with the respective cross-members being provided by pivotal joint means providing at least one axis of rotation therebetween;
   means for applying a force upon said cross-members by way of said longitudinal members to separate the upper carriages from the lower carriages for respectively applying the upper carriages against a gallery roof and the lower carriages against a gallery floor.

2. A roof support capable of being moved by a drive mechanism while under permanent load, comprising:
   a pair of upper parallel carriages;
   a pair of lower parallel carriages;

the pair of upper parallel carriages being disposed above and parallel to the lower pair of parallel carriages;

four endless, articulated tracks, one guided about each respective carriage;

two longitudinally spaced upper cross-members connecting the parallel carriages of the upper pair;

two longitudinally spaced lower cross-members connecting the parallel carriages of the lower pair;

said connecting of these four cross-members being provided by pivotal joint means interpased between each respective cross-member and carriage and providing at least two axes of rotation therebetween;

an upper longitudinal member arranged laterally intermediate the upper parallel carriages and connecting the upper cross-members;

a lower longitudinal member arranged laterally intermediate the lower parallel carriages and connecting the lower cross-members;

each cross-member comprising two parts pivoted together at a pivot joint having a longitudinally extending pivot axis;

means for applying a force upon said cross-members by way of said longitudinal members to separate the upper carriages from the lower carriages for respectively applying the upper carriages against a gallery roof and the lower carriages against a gallery floor.

3. A roof support capable of being moved by a drive mechanism while under permanent load, comprising:

a pair of upper parallel carriages;

a pair of lower parallel carriages;

the pair of upper parallel carriages being disposed above and parallel to the lower pair of parallel carriages;

four endless, articulated tracks, one guided about each respective carriage, each track comprising a succession of shoes;

two longitudinally spaced upper cross-members connecting the parallel carriages of the upper pair;

two longitudinally spaced lower cross-members connecting the parallel carriages of the lower pair;

said connecting of these four cross-members being provided by pivotal joint means interpased between each respective cross-member and carriage and providing at least two axes of rotation therebetween;

an upper longitudinal member arranged laterally intermediate the upper parallel carriages and connecting the upper cross-members;

a lower longitudinal member arranged laterally intermediate the lower parallel carriages and connecting the lower cross-members;

at least one of said longitudinal members being divided into a plurality of longitudinal elements;

means pivotally connecting the respective longitudinal elements of said at least one longitudinal member in series;

means for applying a force upon said cross-members by way of said longitudinal members to separate the upper carriages from the lower carriages for respectively applying the upper carriages against a gallery roof and the lower carriages against a gallery floor.

4. A roof support as claimed in claim 3, wherein the longitudinal elements are connected by a rotary joint having a longitudinal axis.

5. A roof support as claimed in claim 4, wherein the longitudinal elements of one and the same longitudinal member are joined by a jack capable of moving the longitudinal elements towards and away from each other.

6. A roof support as claimed in claim 5, wherein said jack for moving the longitudinal elements towards and away from each other forms the drive mechanism for the support, and further comprising selective means for enabling unidirectional movement of each track relative to its carriage, said selective means comprising unidirectional locking means for at least one shoe of each track on its carriage.

7. A roof support capable of being moved by a drive mechanism while under permanent load, comprising:

a pair of upper parallel carriages;

a pair of lower parallel carriages;

the pair of upper parallel carriages being disposed above and parallel to the lower pair of parallel carriages;

four endless, articulated tracks, one guided about each respective carriage;

two longitudinally spaced upper cross-members connecting the parallel carriages of the upper pair;

two longitudinally spaced lower cross-members connecting the parallel carriages of the lower pair;

said connecting of these four cross-members being provided by pivotal joint means interpased between each respective cross-member and carriage and providing at least two axes of rotation therebetween;

each upper cross-member facing and corresponding with a respective lower cross-member to provide two pairs of cross-members, each including an upper cross-member and a facing, corresponding lower cross-member;

means connected between the cross-members of each pair for applying a force upon the cross-members to separate the upper carriages from the lower carriages for respectively applying the upper carriages against a gallery roof and the lower carriages against a gallery floor.

8. A roof support as claimed in claim 7, wherein the joints between the carriages and the cross-members are ball and socket joints.

9. A roof support capable of being moved by a drive mechanism while under permanent load, comprising:

a pair of upper parallel carriages;

a pair of lower parallel carriages;

the pair of upper parallel carriages being disposed above and parallel to the lower pair of parallel carriages;

four endless, articulated tracks, one guided about each respective carriage;

two longitudinally spaced cross-members connecting the parallel carriages of the one pair;

at least one cross-member connecting the parallel carriages of the other pair;

said connecting of these four cross-members being provided by pivotal joint means interpased between each respective cross-member and carriage and providing at least two axes of rotation therebetween;

means for applying a force upon said cross-members to separate the upper carriages from the lower carriages for respectively applying the upper carriages against a gallery roof and the lower carriages against a gallery floor;

each carriage comprising a return beam for the respective track, each beam being divided into a plurality of longitudinal elements;

the longitudinal elements of each beam being longitudinally spaced apart; and torsion bars serially interconnecting the longitudinal elements of each beam.

10. A roof support as claimed in claim 9, wherein said torsion bars form guide rails for the track.

11. A roof support as claimed in claim 9, wherein each carriage comprises at least two guide rails for the track, at least one guide rail being fixed to each longitudinal element and extending substantially along the beam, at least on its support face, and between the longitudinal elements.

12. A roof support as claimed in claim 9, wherein each carriage comprises a beam on which the track is frictionally mounted, the beam having rounded return ends, and wherein the track is guided around the beam with lateral play on the straight part of the beam and without play on the rounded return ends.

* * * * *